3,766,291
PARA-XYLENE PRODUCTION
Lewis E. Drehman, Bartlesville, Okla., assignor to
Phillips Petroleum Company
Filed Mar. 24, 1972, Ser. No. 237,760
Int. Cl. C07c 5/26, 5/27
U.S. Cl. 260—673.5                                      9 Claims

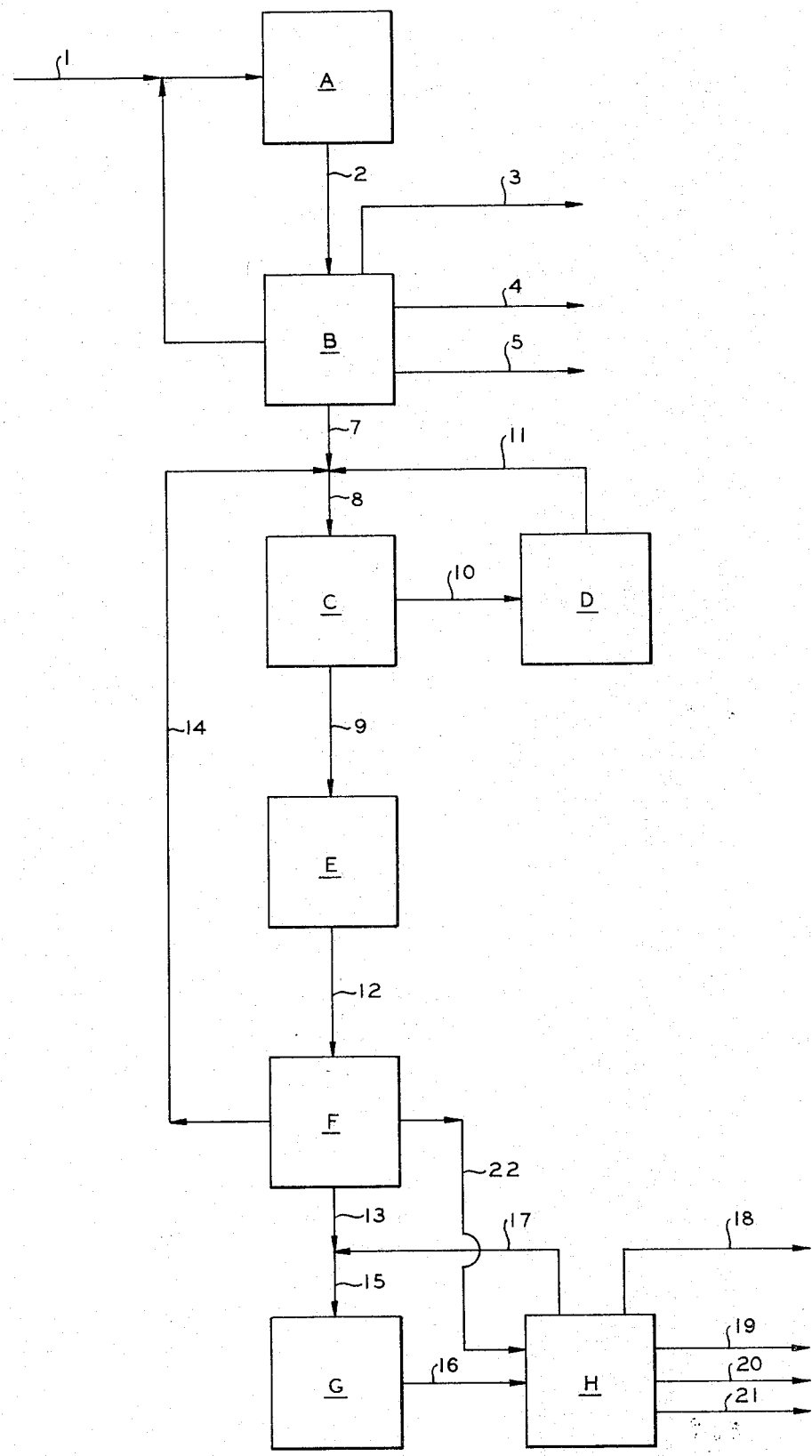

ABSTRACT OF THE DISCLOSURE

A feedstock comprising 3-methylbutene-1 is converted to para-xylene by disproportionation to 2,5-dimethylhexene which is subsequently dehydrocyclized over a catalyst comprising at least one Group VIII metal in association with tin in combination with a Group II aluminate spinel support material.

---

This invention relates to processes for the production of p-xylene.

Commercial xylene is broadly inclusive of the four aromatic isomers having the empirical formula $C_8H_{10}$. The mixture known as commercial xylene or mixed xylenes is generally produced by reforming hydrocarbon feedstock streams which are rich in naphthenes. Recently developed routes for the manufacture of xylenes include the disproportionation of toluene or the trans-alkylation of toluene with trimethylbenzenes.

Commercial xylenes can be used directly, without separation into the individual isomers, as a solvent and, perhaps more importantly, as components for high octane, premium quality gasolines. In their pure form, the individual xylene's principal use is as a starting material for the corresponding dibasic acids. Of the xylenes, p-xylene is in the greatest demand. The p-xylene readily oxidizes to terephthalic acid which serves as a base material for polyesters derived from dimethylterephthalate.

Because of the similarities of these aromatic isomers, the production of individual isomers of high purity, particularly the p-xylene, is difficult. For example, o-xylene can be separated from m-xylene by distillation, but it is only with difficulty that ethylbenzene can be separated from p-xylene in pure form. It is not practical to separate p-xylene from m-xylene by distillation, thereby making mandatory more elaborate and costly methods of separation. The properties of these four aromatic isomers are such that crystallization is the only technique practiced commercially for the production of p-xylene; and, even then, only about 50 percent of the p-xylene present in a mixed stream can be recovered economically.

It is an object of this invention to provide a process for preparing p-xylene.

Another object of this invention is to provide a process for preparing p-xylene whereby p-xylene can be separately recovered by distillation.

Other aspects, objects, as well as the several advantages of the invention will be apparent to one skilled in the art upon a further consideration of the specification, the drawing and the appended claims.

The present invention provides a process for the production of p-xylene which is not subject to the limitations inherent in the recovery of p-xylene from mixed xylene streams. This is accomplished by a combination of steps which has been found to be particularly suitable for specifically producing p-xylene with little or no ethylbenzene or other xylene monomers. A key step is a dehydrocyclization step using a catalyst and process which, even though the reaction conditions are relatively severe, produces p-xylene with little or no troublesome skeletal isomerization. Hence, a particular feature of the invention is that, in the present process, the isolation and recovery of a high purity p-xylene product can be effected by simple distillation rather than by crystallization or other more complex means.

In accordance with this invention, a feed stream comprising isoamylenes is fractionated to obtain a 3-methylbutene-1 stream which is then disproportionated over a suitable olefin disproportionation catalyst to 2,5-dimethylhexen. The 2,5-dimethylhexene is then catalytically dehydrocyclized over a suitable catalyst to p-xylene which can be easily recovered by distillation because all other aromatic isomers are essentially absent. In a preferred embodiment, the isoamylene feed stream is obtained by the catalytic dehydrogeneration of a hydrocarbon feed stream comprising isopentane.

More particularly, the present invention provides a process for the production of p-xylene which comprises separating, in a first separation zone, a mixed isoamylene stream into a mixed stream comprising 2-methylbutene-1 and 2-methylbutene-2, and a 3-methylbutene-1 stream. The 3-methylbutene-1 stream is passed to an olefin disproportionation zone and the disproportionation effluent is passed to a second separation where it is separated to separately recover a 2,5-dimethylhexene stream and an isoamylene stream. The isoamylene stream is combined with the mixed stream comprising 2-methylbutene-1 and 2-methylbutene-2 from the first separation zone and passed to an olefin double bond isomerization zone. The isomerized mixture of isoamylenes, containing substantial amounts of 3-methylbutene-1, is returned to the first separation zone. The 2,5-dimethylhexene stream is passed from the second separation zone to the dehydrocyclization zone and catalytically dehydrocyclized under conditions and with a catalyst selective for p-xylene. The effluent from the dehydrocyclization reaction zone is passed to a third separation zone where p-xylene is isolated and recovered by simple distillation. The unconverted 2,5-dimethylhexene is recycled to the dehydrocyclization zone.

A better understanding of the invention can be obtained upon reference to the accompanying illustrative drawing, which is a schematic flow diagram of a representative embodiment of the processes of this invention.

Referring now to the drawing, feed stream 1 comprising isopentane is fed to dehydrogenation zone A into contact with a suitable dehydrogenation catalyst. Dehydrogenation effluent stream 2 is passed to separation zone B wherein the dehydrogenation product mix is separated into stream 3 consisting essentially of hydrogen and mixed carbon oxides, stream 4 consisting essentially of $C_1$–$C_4$ hydrocarbons, stream 5 consisting essentially of isoprene, stream 6 consisting essentially of unreacted isopentane and stream 7 consisting essentially of 3-methylbutene-1, 2-methylbutene-1 and 2-methylbutene-2. Stream 6 comprising unconverted isopentane is recycled to dehydrogenation zone A. Stream 7 is mixed with other isoamylene streams and passed as stream 8 into separation zone C where the mixed isoamylenes stream is separated into stream 10 consisting essentially of 2-methylbutene-1 and 2-methylbutene-2, and stream 9 consisting essentially of 3-methylbutene-1. Stream 10 is passed to isomerization zone D into contact with a suitable double bond isomerization catalyst wherein the mixed isoamylene stream is isomerized to one containing substantial amounts of 3-methylbutene-1. Isomerization effluent stream 11, consisting now of 3-methylbutene-1, 2-methylbutene-1 and 2-methylbutene-2, is combined with stream 7 from separation zone B and passed as a portion of stream 8 to separation zone C. The 3-methylbutene-1 stream 9 is passed to olefin disproportionation zone E into contact with a suitable olefin disproportionation catalyst where it is converted to products comprising ethylene, propylene, 2,4-dimethylpentene, and 2,5-dimethylhexene. The disproportionation effluent is passed as stream 12 to a third separation zone F wherein the disproportionation product mix is separated into stream 14 consisting essentially of 3-methylbutene-1 which is combined with streams 7 and 11 and recycled to the second separation zone C. The disproportionation effluent is further separated into a stream 13 consisting essentially of 2,5-dimethylhexene and stream 22 consisting essentially of by-products ethylene, propylene and 2,4-dimethylpentene. Stream 13 is combined with other 2,5-dimethylhexene streams and passed as stream 15 into dehydrocyclization zone G and into contact with a suitable dehyrocyclization catalyst. The 2,5-dimethylhexene stream is dehydrocyclized and the effluent is passed to separation zone H where it is combined with by-product stream 22 from separation zone F for separation into stream 18 consisting essentially of hydrogen and mixed carbon oxides, stream 19 consisting essentially of $C_1$–$C_4$ hydrocarbons, ethylene and propylene, stream 20 consisting essentially of $C_5$–$C_7$ hydrocarbons and 2,4-dimethylpentene, stream 21 consisting essentially of product para-xylene and a stream 17 consisting essentially of unreacted 2,5-dimethylhexene. Stream 17 is combined with stream 13 from separation zone F and is fed, as stream 15, to disproportionation zone G. The para-xylene stream 21 is essentially uncontaminated with other isomeric xylenes.

In the embodiment comprising the preparation of p-xylene from a hydrocarbon feedstock comprising isopentane, the isopentane is contacted under suitable reaction conditions with a catalyst which has activity for paraffin dehydrogenation but exhibits little or no concomitant skeletal isomerization activity. A number of such catalysts are known. The particularly suitable class of such dehydrogenation catalysts comprises a steam-stable Group II metal aluminate or aluminate spinel impregnated with a Group VIII metal or metal compound and a tin group metal. Particularly preferred are compositions containing zinc aluminate, tin and platinum. A particularly effective catalyst is a zinc aluminate support, containing a slight excess of zinc, which has been impregnated with 0.4–0.6 weight percent platinum, and 0.4–1 weight percent tin.

The dehydrogenation is generally effected at a temperature in the range of about 750 to about 1250° F., preferably about 900 to about 1050° F.; pressures in the range of about atmospheric to about 500 p.s.i.g., preferably about 50 to about 300 p.s.i.g.; and at a steam:hydrocarbon mol ratio in the range of about 0.5 to about 30, preferably in the range of about 3 to about 20; with a liquid hourly space velocity (LHSV) in the range of about 0.1 to about 10, preferably about 0.5 to about 5.

The isoamylene disproportionation reaction is effected at disproportionation reaction conditions in the presence of a catalyst which is active for the disproportionation of olefins, i.e., a catalyst which will disproportionate an olefin into similar olefins of both higher and lower number of carbon atoms, e.g., propylene into ethylene and butenes. A large number of such catalysts are known. Representative of such catalysts are solid catalysts such as $WO_3/SiO_2$, $MoO_3/SiO_2$, $MoO_3A/Al_2O_3$, $WO_3/Al_2O_3$, $Re_2O_7/Al_2O_3$, $WO_3/AlPO_4$, $Re_2O_7/AlPO_4$, and $MoO_3/AlPO_4$ The presence of minor amounts of alkali or alkaline earth metals in these catalysts is also frequently beneficial.

The disproportionation reaction zone will generally be operated at temperatures in the range of about —60° to about 1200° F., a pressure in the range of about 0 atmospheric to about 2,000 p.s.i.g., and a weight hourly space velocity (WHSV) in the range of about 0.1 to about 1,000, depending upon the specific catalyst composition employed. Particularly preferred is the $WO_3/SiO_2$ olefin disproportionation catalyst which is generally used at temperatures in the range of about 400 to about 1100° F., preferably about 600 to about 900° F.; at pressures in the range of about atmospheric to about 1,500 p.s.i.g., preferably atmospheric to about 500 p.s.i.g.; and at a WHSV in the range of about 0.5 to about 1,000, preferably about 1 to about 500.

In the dehydrocyclization zone, the stream containing the 2,5-dimethylhexene is contacted, under reaction conditions, with a catalyst which has substantial dehydrocyclization activity but with little or no concomitant alkyl rearrangement activity. The steam-stable catalyst comprising the Group II metal aluminate, a tin-group metal, and a Group VIII metal which were described above for the isopentane dehyrogenation zone are also applicable and preferred for this zone. The conditions for the dehydrocyclization reaction can be essentially identical to those for the isopentane dehydrogenation reaction.

In the double bond isomerization zone, the isoamylenes are contacted under appropriate reaction conditions with a catalyst having activity for double bond isomerization but with little or no activity for skeletal isomerization. A large number of such catalysts are known. Generally, these are solid, nonacidic, refractory compositions. Some examples are magnesium oxide, calcium oxide, zinc oxide, zinc aluminate and the like, which can be used either alone or associated with various promoter metals such as Group VIII metals. Catalysts such as magnesium oxide or platinum (0.5 weight percent) on zinc aluminate are particularly preferred.

The reaction conditions in the isomerization zone are generally in the range of about 200 to about 800° F., preferably about 300 to about 600° F.; a pressure in the range of atomspheric to about 1,000 p.s.i.g., preferably in the range of about 50 to about 300 p.s.i.g.; and a liquid hourly space velocity (LHSV) in the range of about 0.1 to about 10, preferably in the range of about 0.5 to about 5.

ILLUSTRATIVE EXAMPLE

In an example according to the invention, isopentane is converted to para-xylene in a sequence of steps as shown in the drawing.

In isopentane dehydrogenation zone A, the isopentane contacts a catalyst of 0.4 wt. percent Pt on zinc aluminate support. The catalyst is also modified by the presence of 1 wt. percent tin. The contact is made at 1020° F., 100 p.s.i.g., at an isopentane LHSV of 4.6, and at a molar steam to hydrocarbon ratio of 8.0.

In isoamylenes double bond isomerization zone D, the conversion is carried out over a MgO double bond isomerization catalyst at 700° F., 200 p.s.i.g., and at a LHSV of 5.0.

In disproportionation zone E, the 3-methylbutene-1 contacts a 8 wt. percent $WO_3$ on silica olefin disproportionation catalyst which has been additionally treated to contain about 0.2 wt. percent Na. The contact is made at 750° F., 500 p.si.g. and at 50 WHSV.

In dehydrocyclization zone G, the 2,5-dimethylhexene contacts a 0.6 wt. percent Pt on zinc aluminate catalyst which also contains 1 wt. percent tin. The reaction is carried out at 980° F., 100 p.s.i.g., at 1.5 LHSV, and at a molar steam to hydrocarbon ratio of 6:0.

In the table below, the amounts of the various intermediate and final products are shown in streams identified by numbers corresponding to those in the drawing.

TABLE

| | Stream composition—mols/hr. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $H_2$ | | 114.7 | 114.7 | | | | | | | | | |
| $CO+CO_2$ | | 4.6 | 4.6 | | | | | | | | | |
| $C_1-C_4$ | | 10.5 | | 10.5 | | | | | | | | 34.9 |
| $C_2H_4$ | | | | | | | | | | | | 8.7 |
| $C_3H_6$ | | | | | | | | | | | | |
| $iC_5H_{12}$ | 100.0 | 95.3 | | | | | 95.3 | | | | | |
| 3-MB-1 | | 6.0 | | | | | | 6.0 | 174.4 | 174.4 | 81.2 | 87.2 |
| 2-MB-1 | | 28.6 | | | | | | 28.6 | 639.6 | | 639.6 | 611.0 |
| 2-MB-2 | | 52.6 | | | | | | 52.6 | 865.4 | | 865.4 | 812.8 |
| $iC_5H_8$ | | 6.5 | | | 6.5 | | | | | | | |
| $C_5-C_7$ | | | | | | | | | | | | |
| 2,4-DMP⁼ | | | | | | | | | | | | 8.7 |
| 2,5-DMHx⁼ | | | | | | | | | | | | 34.9 |
| p-Xylene | | | | | | | | | | | | |
| Coke | | | | | | | | | | | | |
| Σ | 100.0 | 318.8 | 119.3 | 10.5 | 6.5 | 95.3 | 87.2 | 1679.4 | 174.4 | 1505.0 | 1505.0 | 174.4 |

| | Stream compositions—mols/hr. | | | | | | | | | |
|---|---|---|---|---|---|---|---|---|---|---|
| | 13 | 14 | 15 | 16 | 17 | 18 | 19 | 20 | 21 | 22 | Total products |
| $H_2$ | | | | 79.8 | | 79.8 | | | | | 194.5 |
| $CO+CO_2$ | | | | 2.8 | | 2.8 | | | | | 7.4 |
| $C_1-C_4$ | | | | 14.7 | | | 14.7 | | | | 25.2 |
| $C_2H_4$ | | | | | | | 34.9 | | | 34.9 | 34.9 |
| $C_3H_6$ | | | | | | | 8.7 | | | 8.7 | 8.7 |
| $iC_5H_{12}$ | | | | | | | | | | | |
| 3-MB-1 | | 87.2 | | | | | | | | | |
| 2-MB-1 | | | | | | | | | | | |
| 2-MB-2 | | | | | | | | | | | |
| $iC_5H_8$ | | | | | | | | | | | 6.5 |
| $C_5-C_7$ | | | | 2.3 | | | | 2.3 | | | 2.3 |
| 2,4-DMP⁼ | | | | | | | | 8.7 | | 8.7 | 8.7 |
| 2,5-DMHx⁼ | 34.9 | | 46.5 | 11.6 | 11.6 | | | | | | |
| p-Xylene | | | | 26.0 | | | | | 26.0 | | 26.0 |
| Coke | | | | | | | | | | | 4.5 |
| Σ | 34.9 | 87.2 | 46.5 | 137.2 | 11.6 | 82.6 | 58.3 | 11.0 | 26.0 | 52.3 | 318.7 |

Reasonable variations and modifications are possible within the scope of this disclosure without departing from the spirit and scope thereof.

I claim:

1. A process for the preparation of p-xylene from a feed stream comprising isoamylenes comprising the steps of:

separating, in a first separation zone, said feed stream comprising isoamylenes into a first stream comprising 3-methylbutene-1 and a second stream comprising other isoamylenes;

passing said first stream comprising 3-methylbutene-1 to a disproportionation zone into contact with a disproportionation catalyst at disproportionation reaction conditions to form a first reaction mixture comprising 2,5-dimethylhexene and isoamylenes;

separating, in a second separation zone, said first reaction mixture into a third stream comprising 2,5-dimethylhexene and a fourth stream comprising isoamylenes;

passing said second stream comprising isoamylenes and said fourth stream comprising isoamylenes to an isomerization zone into contact with a double bond isomerization catalyst characterized by having substantially no skeletal isomerization capability under isomerization reaction conditions to form a second reaction mixture comprising a mixture of isoamylenes;

recycling said mixture of isoamylenes to said first separation zone;

passing said third stream comprising 2,5-dimethylhexenes to a dehydrocyclization zone into contact with a dehydrocyclization catalyst characterized by having substantially no alkyl rearrangement activity under dehydrocyclization reaction conditions to form a third reaction mixture comprising p-xylene; and separately recovering p-xylene from said third reaction mixture.

2. A process according to claim 1 wherein said feedstock comprising isoamylenes is obtained by contacting a hydrocarbon feedstock comprising isopentane with a paraffinic dehydrogenation catalyst under dehydrogenation conditions.

3. A process according to claim 2 wherein said paraffinic dehydrogenation catalyst and said dehydrocyclization catalyst is selected from the group consisting of at least one Group VIII metal or metal compound in association with at least one tin group metal or metal compound in combination with at least one Group II metal aluminate support material.

4. A process according to claim 3 wherein said Group VIII metal or metal compound is platinum, said tin group metal or metal compound is tin and said Group II metal aluminate is zinc aluminate.

5. A process according to claim 1 wherein said dehydrocyclization catalyst is selected from the group consisting of at least one Group VIII metal or metal compound in association with at least one tin group metal or metal compound in combination with at least one Group II metal aluminate support material.

6. A process according to claim 5 wherein said Group VIII metal or metal compound is platinum, said tin group metal or metal compound is tin and said Group II aluminate is zinc aluminate.

7. A process for the preparation of p-xylene from isopentane which comprises contacting a hydrocarbon feedstock comprising isopentane under dehydrogenation conditions with an isopentane dehydrogenation catalyst, a steam-stable Group II metal aluminate or aluminate spinel impregnated with a Group VIII metal or metal compound and a tin group metal whereby there is formed a first reaction mixture stream comprising isoamylenes;

separating in a first fractionation zone said first reaction mixture comprising isoamylenes into a first stream comprising 3-methylbutene-1 and a second stream comprising other isoamylenes;

passing said first stream comprising 3-methylbutene-1 to a disproportionation zone into contact with a disproportionation catalyst selected from the group consisting of catalysts of the formulas $WO_3/SiO_2$, $MoO_3/SiO_2$, $MoO_3/Al_2O_3$, $WO_3/Al_2O_3$, $Re_2O_7/Al_2O_3$, $WO_3/AlPO_4$, $Re_2O_7/AlPO_4$ and $MoO/AlPO_4$ at disproportionation reaction conditions to form a second reaction mixture comprising 2,5-dimethylhexene and isoamylenes;

separating, in a second fractionation zone, said second reaction mixture into a third stream comprising 2,5-dimethylhexene and a fourth stream comprising isoamylenes;

passing said third stream comprising 2,5-dimethylhexene to a dehydrocyclization zone into contact with a dehydrocyclization catalyst selected from a steam-stable catalyst comprising a Group II metal aluminate, a tin group metal and a Group VIII metal under dehydrocyclization conditions to form a third reaction mixture comprising p-xylene; and separately recovering by distillation p-xylene from said fourth reaction mixture.

8. A process according to claim 7 wherein said second stream comprising isoamylenes and said fourth stream comprising isoamylenes are passed to an isomerization zone into contact with a double bond isomerization catalyst selected from the group consisting of magnesium oxide, calcium oxide, zinc oxide and zinc aluminate, either alone or in association with a Group VIII promoter metal, under isomerization reaction conditions to form a mixture of isoamylenes and thereafter recycling said resulting mixture of isoamylenes to said first fractionation zone.

9. The process of claim 8 wherein said isopentane dehydrogenation catalyst is comprised of platinum/tin on a zinc aluminate support; said disproportionation catalyst is comprised of $WO_3/Na$ on silica; said dehydrocyclization catalyst is comprised of platinum/tin on a zinc aluminate; and said isomerization catalyst is comprised of a magnesium oxide double bond isomerization catalyst.

References Cited

UNITED STATES PATENTS

| | | | |
|---|---|---|---|
| 3,631,215 | 12/1971 | Clippinger et al. | 260—673 |
| 3,674,706 | 7/1972 | Box et al. | 260—683.3 |
| 3,670,044 | 6/1972 | Drehman | 260—683.3 |
| 3,511,888 | 5/1970 | Jenkins | 260—673.5 |
| 3,080,438 | 3/1963 | Sailors | 260—673 |
| 3,365,513 | 1/1968 | Heckelsberg | 260—683 |
| 3,531,543 | 9/1970 | Clippinger et al. | |

FOREIGN PATENTS

| | | | |
|---|---|---|---|
| 1,145,503 | 3/1969 | Great Britain | 260—673.5 |

DELBERT E. GANTZ, Primary Examiner

J. M. NELSON, Assistant Examiner

U.S. Cl. X.R.

260—680, 683 D